(12) United States Patent
Naber et al.

(10) Patent No.: US 8,746,706 B2
(45) Date of Patent: Jun. 10, 2014

(54) METHOD FOR OPERATING A LEVELING DEVICE OF A VEHICLE

(75) Inventors: Thomas Naber, Ahaus (DE); Joseph Bounds, Fishers, IN (US)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 13/581,241

(22) PCT Filed: Feb. 23, 2011

(86) PCT No.: PCT/EP2011/052677
§ 371 (c)(1),
(2), (4) Date: Dec. 3, 2012

(87) PCT Pub. No.: WO2011/104272
PCT Pub. Date: Sep. 1, 2011

(65) Prior Publication Data
US 2013/0069323 A1    Mar. 21, 2013

(30) Foreign Application Priority Data

Feb. 25, 2010  (EP) .................................... 10154615

(51) Int. Cl.
*B60G 17/04*    (2006.01)
(52) U.S. Cl.
USPC ..................................................... 280/5.514
(58) Field of Classification Search
USPC ........... 280/5.514, 5.515, 5.516, 5.507, 5.508
See application file for complete search history.

(56) References Cited

U.S. PATENT DOCUMENTS

| | | | |
|---|---|---|---|
| 5,141,245 A * | 8/1992 | Kamimura et al. | 280/5.514 |
| 5,579,430 A | 11/1996 | Grill et al. | |
| 5,593,176 A * | 1/1997 | Campbell et al. | 280/5.514 |
| 5,684,698 A * | 11/1997 | Fujii et al. | 701/38 |
| 2005/0212225 A1 | 9/2005 | Suzuki et al. | |

FOREIGN PATENT DOCUMENTS

| | | |
|---|---|---|
| DE | 103 52 186 | 1/2005 |
| DE | 10 2006 016140 | 10/2007 |
| DE | 10 2006 016989 | 10/2007 |
| DE | 10 2006 058686 | 6/2008 |
| EP | 0 192 178 | 8/1986 |
| EP | 1 256 466 | 11/2002 |
| EP | 1 644 209 | 4/2006 |
| JP | 57 172808 | 10/1982 |
| JP | 58 030809 | 2/1983 |
| JP | 59 023713 | 2/1984 |

OTHER PUBLICATIONS

Machine translation of WO2005002892 also published as EP1644209B1; Hein, et al.; published Feb. 2008.*
International Search Report of PCT/EP2011/052677 dated Mar. 29, 2011.

(Continued)

*Primary Examiner* — Faye M. Fleming
(74) *Attorney, Agent, or Firm* — Kenyon & Kenyon LLP

(57) ABSTRACT

A method for operating a ride height control device, which includes at least one air spring, of a vehicle body of a vehicle, by providing a setpoint ride height predefined for a journey, and by setting, at the beginning, during or immediately before the end of the journey, the ride height of the vehicle body at least once to a ride height which deviates from the setpoint ride height predefined for the journey.

12 Claims, 1 Drawing Sheet

(56) References Cited

OTHER PUBLICATIONS

European Patent Office, International Preliminary Report on Patentability, Aug. 28, 2012, from International Patent Application No. PCT/EP2011/052677, filed on Feb. 23, 2011.

English Translation of European Patent Office, International Preliminary Report on Patentability, Aug. 28, 2012, from International Patent Application No. PCT/EP2011/052677, filed on Feb. 23, 2011.

* cited by examiner

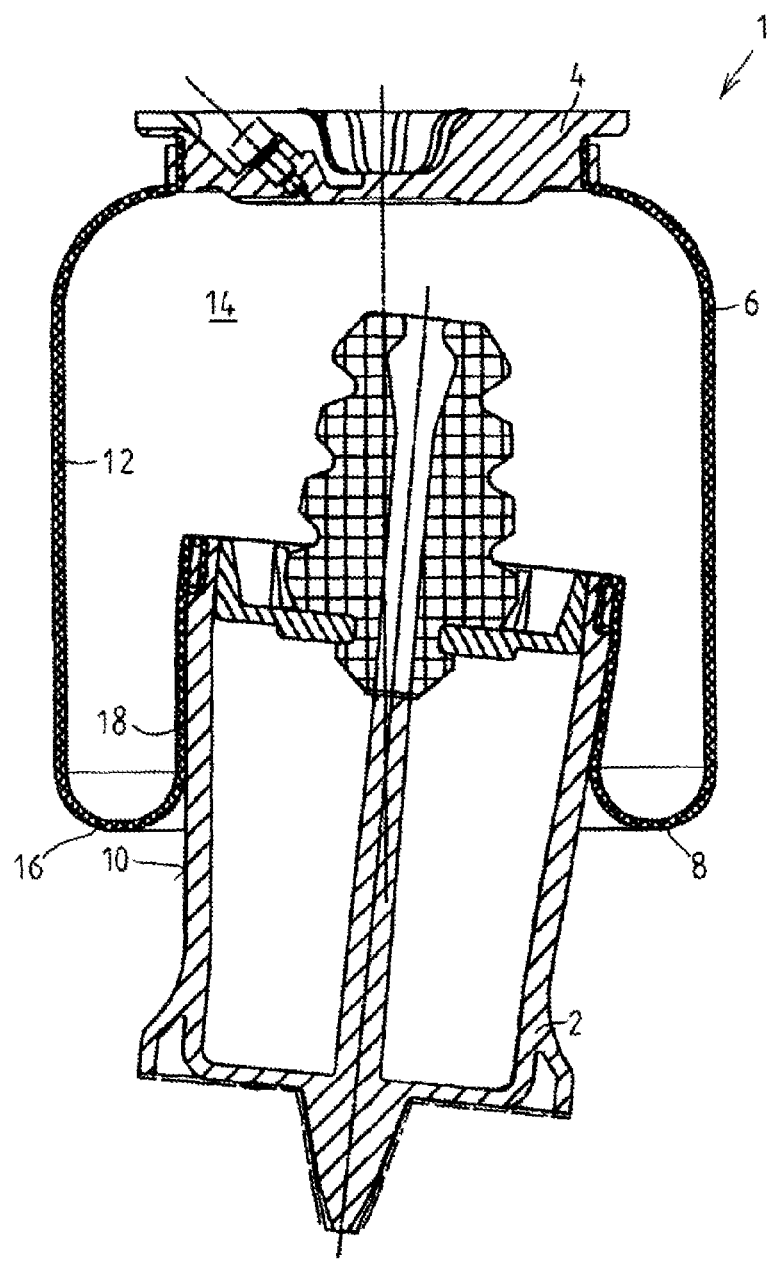

METHOD FOR OPERATING A LEVELING DEVICE OF A VEHICLE

FIELD OF THE INVENTION

The present invention relates to a method for operating a ride height control device of a vehicle body of a vehicle, which ride height control device includes at least one air spring.

BACKGROUND INFORMATION

The air volume of air springs is utilized, on the one hand, for the suspension of axles of motor vehicles. On the other hand, through the aeration and deaeration of air spring bellows by a valve device, such air springs permit ride height control, which offers advantages in particular for utility vehicles, if the vehicle body thereof must be set to the level of a ramp for example for loading purposes, or if a correction must be carried out in order to avoid an oblique position of the body owing to an eccentric load. Here, each wheel or else only each axle may be assigned an air bellows. Such a ride height control device is known for example from DE 10 2006 016 989 A1.

As spring elements of the air springs, use is made of corrugated bellows or rolling bellows, wherein an air spring which has a rolling bellows is discussed, for example, in DE 10 2006 016 140 A1. According to this document, the rolling bellows is composed of an elastomer material which deforms during aeration and deaeration or during a change in ride height of the vehicle body, and has in particular a roll fold which can roll on a radially outer circumferential wall of a rolling piston.

It is believed to be understood that wear of the corrugated bellows or rolling bellows constitutes a problem, and that in particular tears in the bellows can occur as a result of wear. The weak point of rolling bellows is most commonly situated at the roll fold, that is to say at that point of the rolling bellows at which the material undergoes its most intense change in direction and at which the strain of the material in the transverse and longitudinal directions changes during every stroke movement.

Since an exchange of the corrugated bellows or rolling bellows must be performed in a workshop, the vehicle is no longer available for use during the period of repair, which is a disadvantage in particular in the case of utility vehicles used for commercial purposes.

To counteract the problem of wear of air spring bellows, it is indicated in DE 10 2006 016 140 A1 that the air spring bellows has, on at least one of its radial lateral surfaces, a supporting layer which extends over the entire lateral surface and which is composed of a textile structure. It is the intention of this to protect the elastomer lateral surface from external influences.

In DE 10 2006 058 686 A1, to prevent temperature-induced wear of rolling bellows, it is indicated that the average temperature of the rolling bellows wall be reduced by cooling by virtue of cooling air being extracted from the compressed-air accumulator of the air spring system.

Aside from temperature-induced wear and wear induced by external influences, wear of the air spring bellows also arises owing to the mechanical loads which act during use.

SUMMARY OF THE INVENTION

By contrast, it is an object of the exemplary embodiments and/or exemplary methods of the present invention to provide a method for operating a ride height control device of a vehicle body of the type mentioned in the introduction, so that the wear of the air springs is reduced.

This object may be achieved according to the exemplary embodiments and/or exemplary methods of the present invention by the features described herein.

From experience, during the journey of a vehicle with air suspension and with ride height control, adjustment is constantly performed so as to set a preferred setpoint right height, such that for example during the journey, the roll fold of a rolling bellows is always subjected to maximum bending at the same point by the internal pressure, as a result of which a locally high permanent loading is generated.

It is thus provided according to the exemplary embodiments and/or exemplary methods of the present invention that, at the beginning, during or immediately before the end of a journey, the ride height of the vehicle body is set at least once to a ride height which deviates from a setpoint ride height predefined for the journey.

In the ride height position which deviates from the setpoint ride height, it is then the case for example in a rolling bellows that the roll fold of the rolling bellows, that is to say the point of maximum deflection or bending of the elastomer material, is formed, as viewed in the longitudinal or compression direction of the air spring, by a portion of the casing wall other than that which forms the roll fold at the setpoint ride height. Consequently, during the journey, different regions of the casing wall of the rolling bellows are subjected to maximum loading, as a result of which the wear of the bellows wall is no longer restricted only to the region assigned to the setpoint ride height, but rather is distributed over larger regions of the bellows wall. This results in more uniform bending and strain loading of the bellows wall, which reduces the local wear, and consequently a lengthening of the service life of the air spring bellows operated in accordance with the method according to the present invention can be expected.

Since the change, which takes place at least once, of the ride height of the vehicle body away from the setpoint ride height is supposed to take place at the beginning of a journey, during the journey or immediately before the end of a journey, it must be ensured that only ride height values deviating from the setpoint ride height are set which cannot lead to a risk of violation or to a violation of traffic regulations. The ride height change(s) therefore also may take place very slowly.

The exemplary embodiments and/or exemplary methods of the present invention are not restricted to air springs with rolling bellows, but rather may also be applied to air springs with corrugated bellows.

Advantageous refinements of and improvements to the present invention specified in the description herein may be provided by the further measures specified herein.

It particularly may be the case that if, at the beginning, during or immediately before the end of the journey, the ride height of the vehicle body is varied such that an adjustment range from a lower ride height value to an upper ride height value is run through at least once, wherein the upper ride height value and the lower ride height value deviate from the setpoint ride height provided for the journey. Said adjustment range is in particular the entire possible adjustment range during a journey, wherein the lower ride height value is the lowest ride height that can be set during the journey and the upper ride height value is formed by the highest ride height that can be set during the journey. Here, the expression "possible adjustment range" is delimited by maximum and minimum possible ride height values which are admissible and which cannot lead to a risk of violation or to a violation of traffic regulations. In this way, the maximum possible area for example of the bellows wall of a rolling bellows passes into the region of the most intensely deformed roll fold, such that in this way, the loading of the bellows wall is distributed over the largest possible area.

In one refinement, during a time period from the beginning of a journey to immediately before the end of the journey, the ride height of the vehicle body may be set at regular or irregular time intervals to a ride height which deviates from the setpoint ride height predefined for the journey. Said automatic adjustment of the ride height may take place within the context of the ride height control by the control unit of the ride height control device. Through multiple adjustment of the ride height during the journey, the loading is distributed not only with regard to the surface of the rolling bellows but rather also over time. Here, it is possible in particular that, during every adjustment of the ride height, a ride height is set which also deviates from the preceding ride height.

More details will emerge from the following description of an exemplary embodiment.

Below, an exemplary embodiment of the present invention is illustrated in the drawing and is explained in more detail in the following description.

BRIEF DESCRIPTION OF THE DRAWING

The FIGURE is a cross-sectional illustration of an air spring having a rolling bellows according to an exemplary embodiment of the present invention.

DETAILED DESCRIPTION

The FIGURE shows an air spring 1 such as is believed to be known, having a rolling piston 2, a bellows cover 4 arranged at a vertical distance therefrom, and having a rolling bellows 6 composed of an elastomer material, which rolling bellows rolls with a roll fold 8 on a radially outer circumferential surface 10 of the rolling piston. As can be seen from the FIGURE, it is the case here that the roll fold 8 forms that portion of the bellows wall 12 which is subjected to the most intense deflection or bending, in this case through approximately 180 degrees.

Here, the rolling bellows 6 encloses, together with the bellows cover 4 and the rolling piston 2, an air chamber 14 which can be aerated and deaerated in order to adjust the ride height of a vehicle body in relation to a vehicle chassis.

Here, the air spring 1 is part of an air suspension device with ride height control, by which setting of or adjustment to a ride height setpoint value can be performed manually, for example for the loading of trailers at ramps, and/or automatically within the context of a control regime.

When the vehicle sets out on a journey or is on a journey, it is initially the case, as in the prior art, that the ride height of the vehicle body is adjusted, by a control unit (not shown here) of the ride height control device, to a predefined setpoint ride height in relation to the vehicle chassis. At said setpoint ride height, it is then the case for example that that portion of the bellows wall 12 of the rolling bellows 6 which is denoted by the reference numeral 16 is situated in the region of the roll fold 8.

If, at the beginning, during or immediately before the end of a journey, the ride height of the vehicle body is then set at least once to a ride height which deviates from the setpoint ride height predefined for the journey, in this case for example to a ride height higher than the setpoint ride height, then the rolling bellows, with its end fastened to the rolling piston, rolls upward in the FIGURE on the outer circumferential surface 10 of said rolling piston, such that another portion, denoted in this case by the reference numeral 18, of the rolling bellows 6 passes into the region of the roll fold 8.

Consequently, during the journey, different portions 16 and 18 of the bellows wall 12 of the rolling bellows 6 form the most intensely loaded roll fold 8, as a result of which the wear of the bellows wall 12 is no longer restricted to the portion 16 assigned to the setpoint ride height.

It particularly may be that if, at the beginning, during or immediately before the end of the journey, the ride height of the vehicle body is varied such that an adjustment range from a lower ride height value to an upper ride height value is run through at least once, wherein the upper ride height value and the lower ride height value deviate from the setpoint ride height provided for the journey.

In particular, said adjustment range is the entire possible adjustment range during a journey, wherein the lower ride height value is the lowest ride height that can be set during the journey and the upper ride height value is formed by the highest ride height that can be set during the journey. In this way, the maximum possible area of the bellows wall 12 of the rolling bellows 6 passes into the region of the most intensely deformed roll fold 8, such that in this way, the loading of the bellows wall 12 is distributed over the greatest possible area.

The selected range between the lower ride height value and the upper ride height value, or the ride height value which deviates from the setpoint ride height, is dependent in particular on the condition of the road presently being travelled upon, in particular on any unevennesses present in said road. For example, on a relatively smooth road, small spring travels are adequate, whereas on uneven roads, a larger spring travel is required. It therefore may be that for the condition of the road presently being travelled upon to be detected by a sensor device, for example by acceleration sensors attached to the chassis, and for the adjustment range from the lower ride height value to the upper ride height value, or the ride height value which deviates from the setpoint value predefined for the journey, to be set as a function of the condition of the road.

This has the result that a lower ride height value is set on a smooth road than on an uneven road. Driving with a lower ride height value which deviates from the setpoint ride height predefined for the journey additionally results in energy being saved because the vehicle becomes more aerodynamic. The times spent driving with the different ride heights as a function of the condition of the road may be added up and distributed evenly over the total journey time.

Furthermore, during a time period from the beginning of a journey to immediately before the end of the journey, the ride height of the vehicle body may be set at regular or irregular time intervals to a ride height which deviates from the setpoint ride height predefined for the journey. Said automatic adjustment of the ride height may take place within the context of the ride height control by the control unit of the ride height control device.

Here, it is the case in particular that, during every adjustment of the ride height of the vehicle body to a ride height which deviates from the setpoint ride height, a ride height is set which deviates from the preceding ride height.

The time periods during which the setpoint ride height and the one or more ride heights which deviate from the setpoint ride height are set are dependent here on factors such as driving time and the load on the rolling bellows or the condition of the road, and are defined by a person skilled in the art according to requirements.

The above-described embodiments of the method may be implemented individually and in each case in combination with one another.

The List of reference numerals is as follows:
1 Air spring
2 Rolling piston
4 Bellows cover
6 Rolling bellows
8 Roll fold
10 Circumferential surface
12 Bellows wall
14 Air chamber
16 Portion
18 Portion

The invention claimed is:

1. A method for operating a ride height control device, which includes at least one air spring, of a vehicle body of a vehicle, the method comprising:
providing a setpoint ride height predefined for a journey; and
setting, at the beginning, during or immediately before the end of the journey, the ride height of the vehicle body at least once to a ride height which deviates from the setpoint ride height predefined for the journey;
wherein when the ride height position deviates from the setpoint ride height, a roll fold of a bellows, which is a point of maximum deflection or bending of an elastomer material of the bellows, is formed, as viewed in a longitudinal or compression direction of the air spring, by a portion of a casing wall other than that which forms the roll fold at the setpoint ride height.

2. The method of claim 1, further comprising:
varying, at the beginning, during or immediately before the end of the journey, the ride height of the vehicle body so that an adjustment range from a lower ride height value to an upper ride height value is run through at least once;
wherein the upper ride height value and the lower ride height value deviate from the setpoint ride height provided for the journey.

3. The method of claim 2, wherein the adjustment range is the entire possible adjustment range during a journey, and wherein the lower ride height value is the lowest ride height that can be set during the journey and the upper ride height value is formed by the highest ride height that can be set during the journey.

4. The method of claim 1, wherein during a time period from the beginning of a journey to immediately before the end of the journey, the ride height of the vehicle body is set at regular or irregular time intervals to a ride height which deviates from the setpoint ride height predefined for the journey.

5. The method of claim 1, further comprising:
during every adjustment of the ride height of the vehicle body to a ride height which deviates from the setpoint ride height, setting a ride height which deviates from the preceding ride height.

6. The method of claim 2, wherein the ride height which deviates from the setpoint ride height, or the adjustment range from the lower ride height value to the upper ride height value, is defined as a function of the condition of the road being traveled upon.

7. The method of claim 6, wherein the condition of the road being traveled upon is detected in an online manner.

8. The method of claim 1, further comprising:
varying, at the beginning, during or immediately before the end of the journey, the ride height of the vehicle body so that an adjustment range from a lower ride height value to an upper ride height value is run through at least once; and
during every adjustment of the ride height of the vehicle body to a ride height which deviates from the setpoint ride height, setting a ride height which deviates from the preceding ride height;
wherein the upper ride height value and the lower ride height value deviate from the setpoint ride height provided for the journey,
wherein the adjustment range is the entire possible adjustment range during a journey, and wherein the lower ride height value is the lowest ride height that can be set during the journey and the upper ride height value is formed by the highest ride height that can be set during the journey.

9. The method of claim 8, wherein during a time period from the beginning of a journey to immediately before the end of the journey, the ride height of the vehicle body is set at regular or irregular time intervals to a ride height which deviates from the setpoint ride height predefined for the journey.

10. The method of claim 8, wherein the ride height which deviates from the setpoint ride height, or the adjustment range from the lower ride height value to the upper ride height value, is defined as a function of the condition of the road being traveled upon.

11. The method of claim 10, wherein the condition of the road being traveled upon is detected in an online manner.

12. The method of claim 1, wherein during the journey, different regions of the casing wall of the bellows are subjected to maximum loading, as a result of which the wear of the bellows wall is no longer restricted only to the region assigned to the setpoint ride height, so that it is distributed over larger regions of the bellows wall, so as to result in more uniform bending and strain loading of the bellows wall, which reduces the local wear and consequently lengthens a service life of the bellows.

* * * * *